US008857891B2

(12) United States Patent
Jeon

(10) Patent No.: US 8,857,891 B2
(45) Date of Patent: Oct. 14, 2014

(54) SUPPORTING STRUCTURE OF DOOR IMPACT BEAM FOR VEHICLE

(71) Applicants: Hyundai Motor Company, Seoul (KR); Kia Motors Corporation, Seoul (KR)

(72) Inventor: Dong Min Jeon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/679,872

(22) Filed: Nov. 16, 2012

(65) Prior Publication Data

US 2013/0140845 A1 Jun. 6, 2013

(30) Foreign Application Priority Data

Dec. 1, 2011 (KR) .......................... 10-2011-0127559

(51) Int. Cl.
*B60J 5/00* (2006.01)
*B60J 5/04* (2006.01)
(52) U.S. Cl.
CPC .............. *B60J 5/0455* (2013.01); *B60J 5/0437* (2013.01)
USPC ..................................................... 296/146.6
(58) Field of Classification Search
CPC . H01L 2924/00; Y02E 60/12; C08L 2666/02; C08L 67/02; C08L 71/02; H01M 2/204
USPC ............. 296/146.6, 187.03; 280/727; 29/428, 29/437, 505, 515, 516, 17
See application file for complete search history.

(56) References Cited

U.S. PATENT DOCUMENTS

| 566,544 | A | * | 8/1896 | Smith | 248/68.1 |
| 3,894,706 | A | * | 7/1975 | Mizusawa | 248/68.1 |
| 4,378,395 | A | * | 3/1983 | Asoshina et al. | 428/158 |
| 5,232,261 | A | * | 8/1993 | Kuroda et al. | 296/146.4 |
| 5,404,690 | A | * | 4/1995 | Hanf | 296/146.6 |
| 5,544,930 | A | * | 8/1996 | Stedman | 296/146.6 |
| 5,599,057 | A | * | 2/1997 | Hirahara et al. | 296/146.6 |
| 5,785,376 | A | * | 7/1998 | Nees et al. | 296/146.6 |
| 5,800,007 | A | * | 9/1998 | Cho | 296/146.6 |
| 5,813,719 | A | * | 9/1998 | Kowalski | 296/146.6 |
| 6,039,387 | A | * | 3/2000 | Choi | 296/187.12 |

(Continued)

FOREIGN PATENT DOCUMENTS

| KR | 2001-0065645 A | 7/2001 |
| KR | 10-2002-0049354 A | 6/2002 |
| KR | 2002-0049354 A | 6/2002 |
| KR | 10-1144079 B1 | 5/2012 |

*Primary Examiner* — Kiran B Patel
(74) *Attorney, Agent, or Firm* — Morgan, Lewis & Bockius LLP

(57) ABSTRACT

A supporting structure of a door impact beam for a vehicle mounted on an inner panel of a door for the vehicle, may include a coupling part formed with a coupling groove to which the impact beam may be coupled, a supporting part bent downwardly from the coupling part and supporting the coupling part, and mounting parts provided along side portions of the coupling part and the supporting part and mounted on the inner panel of the door, wherein the coupling part, the supporting part, and the mounting part may be integrally formed, and the coupling part and the supporting part may be protruded from the inner panel of the door to form a reinforcing part.

8 Claims, 6 Drawing Sheets

(56) References Cited

U.S. PATENT DOCUMENTS

| | | | |
|---|---|---|---|
| 6,082,811 A * | 7/2000 | Yoshida | 296/187.03 |
| 6,382,707 B1 * | 5/2002 | Dunneback | 296/146.6 |
| 6,550,847 B2 * | 4/2003 | Honda et al. | 296/146.6 |
| 7,819,462 B1 * | 10/2010 | Owens | 296/146.6 |
| 7,857,375 B2 * | 12/2010 | Huttsell et al. | 296/146.6 |
| 8,061,762 B2 * | 11/2011 | Arvidsson et al. | 296/146.6 |
| 8,215,706 B2 * | 7/2012 | Ohta et al. | 296/187.12 |
| 2012/0163906 A1 * | 6/2012 | Inoue et al. | 403/265 |

* cited by examiner

SUPPORTING STRUCTURE OF DOOR IMPACT BEAM FOR VEHICLE

CROSS-REFERENCE TO RELATED APPLICATION

The present application claims priority to Korean Patent Application No. 10-2011-0127559, filed on Dec. 1, 2011, the entire contents of which is incorporated herein for all purposes by this reference.

BACKGROUND OF THE INVENTION

1. Field of the invention

The present invention relates to a supporting structure of a door impact beam for a vehicle, and more particularly, to a supporting structure of a door impact beam for a vehicle with improved side impact performance.

2. Description of Related Art

Generally, passengers are badly hurt by a side impact of a car at the time of a car accident. Therefore, each door of a car is mounted with impact beams so as to perform a buffer action at the time of impact, thereby improving a safety of passengers. The impact beam is a reinforcing structure that prevents doors from being pushed to reduce a damage inside a car.

Further, the impact beam serves to prevent an appearance of doors from being deformed due to a repeated operation of the opening and closing of the doors for a long period of time, in addition to protect passengers.

The impact beam has a pipe shape and is mounted on a door in a longitudinal direction of a car to prepare against the side impact of a car. The impact beam is supported by a bracket that is mounted on an inner panel of a door.

The bracket according to the related art for supporting the impact beam is generally further mounted with a reinforcing bracket in addition to a base bracket so as to reinforce a supporting force. The bracket supporting the impact beam may be implemented to have various shapes. One example of the bracket will be described with reference to FIGS. 4 to 6. FIG. 4 is a perspective view of a supporting structure of a door impact beam for a vehicle, FIG. 5 is a cross-sectional view taken along the line C-C of FIG. 4, and FIG. 6 is a cross-sectional view taken along the line D-D of FIG. 5.

A base bracket 121 fixes an impact beam 110 to a door while supporting the impact beam 110. The base bracket 121 is provided in a cantilever form by integrally bending a coupling part 122, an arm 123, and an inclined part 124. A surface of the arm 123 is provided with a fixed groove 125 so that the impact beam 110 is fitted in the arm 123.

The coupling part 122 is fixed to a side outer of an inner panel 130 of a door by a spot welding. The inclined part 124 extends while having a predetermined slope by being bent from the coupling part 122 and the arm 123 supports the impact beam 110 by being bent from the inclined part 124. The arm 123 has a semi-circular shape so that the fixed groove 125 for the fitting of the impact beam 110 meets a shape of the impact beam 110. Therefore, the impact beam 110 is fitted in the fixed groove 125 so as to be supported by the base bracket 121 and connected with a door of the vehicle.

The reinforcing bracket 140 is further mounted on the inner panel of the door so as to support the cantilever form of the base bracket 121. The reinforcing bracket 140 is integrally provided with a vertical coupling part 141 and a reinforcing arm 142. The vertical coupling part 141 is fixed to an inner side of the side outer of the inner panel 130 of the door by the spot welding. The vertical coupling part 141 connects the reinforcing bracket 140 with the door and supports the reinforcing arm 142 of the reinforcing bracket 140. The reinforcing arm 142 is bent from the vertical coupling part 141 so as to be adjacent to the surface of the arm 123 of the base bracket 121. The surface of the reinforcing arm 142 is also provided with a semi-circular reinforcing groove 143 meeting the shape of the impact beam 110 similar to the arm 123 of the base bracket 121. Therefore, the reinforcing bracket 140 further supports the base bracket 121 in a vertical direction to improve the impact performance of the base bracket 121 having a cantilever shape.

However, as illustrated in FIG. 6, the reinforcing bracket 140 of the bracket supporting the impact beam 110 according to the related art is easily collapsed at the time of the impact due to the absence of the portion connected with the door except for the vertical coupling part 141. Therefore, the impact energy transferred to a door of a vehicle at the time of the side impact of the vehicle is not sufficiently absorbed and therefore, large impact energy is transferred to an interior of the vehicle. Therefore, a need exists for a method for improving the side impact performance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a supporting structure of a door impact beam for a vehicle with improved side impact performance.

In an aspect of the present invention, a supporting structure of a door impact beam for a vehicle mounted on an inner panel of a door for the vehicle, may include a coupling part formed with a coupling groove to which the impact beam is coupled, a supporting part bent downwardly from the coupling part and supporting the coupling part, and mounting parts provided along side portions of the coupling part and the supporting part and mounted on the inner panel of the door, wherein the coupling part, the supporting part, and the mounting part are integrally formed, and the coupling part and the supporting part are protruded from the inner panel of the door to form a reinforcing part.

An end of the coupling part and an end of the supporting part are open.

The coupling groove is spaced from the inner panel with a predetermined interval.

A portion of the supporting part is spaced from the inner panel with a predetermined interval.

A portion of the coupling part is spaced from the inner panel with a predetermined interval.

The coupling groove is formed between a pair of coupling parts and supporting parts to receive the impact beam between the pair of the coupling parts wherein a portion of the supporting parts is spaced from the inner panel with a predetermined interval., wherein a portion of the coupling parts is spaced from the inner panel with a predetermined interval, wherein the reinforcing part may include convex parts, and a concave part formed between the convex parts by being bent from the convex parts.

The concave part is formed by extending the coupling groove between the coupling parts and the supporting parts.

The convex parts are formed by extending the supporting parts and the coupling parts.

The convex parts are symmetrical to each other based on the concave part.

The mounting parts are coupled with the inner panel of the door by a welding.

As a result, the supporting performance of the impact beam can be further improved than the related art and the safety can be increased by minimizing the amount of impact energy transferred to the interior at the time of impact.

An end of the coupling part and an end of the supporting part may be opened.

As a result, it is possible to further increase the rigidity of the supporting structure.

The reinforcing part may include convex parts; and a concave part formed by being bent from the convex parts.

As a result, it is possible to further firmly support the impact beam and effectively disperse the impact energy at the time of the transfer of the impact energy.

The concave part may be formed by extending the coupling groove from the coupling part to the supporting part.

The reinforcing part may be provided with the convex parts symmetrical to each other based on the concave part.

As a result, the impact beam may be supported at both sides to further stably support the impact beam and disperse the impact energy.

The mounting part may be coupled with the inner panel of the door by a welding.

As a result, it is possible to further increase an adhesion surface of the impact beam and further stably mount the impact beam.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
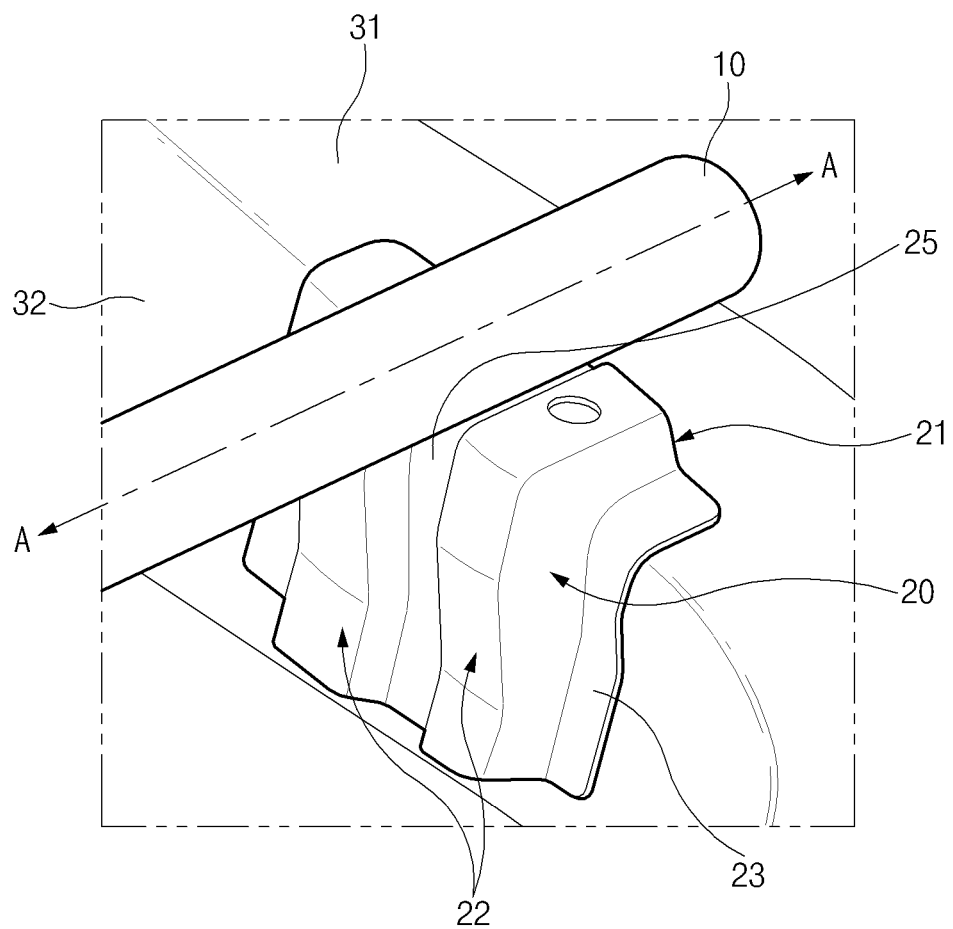
FIG. 1 is a perspective view of a supporting structure of a door impact beam for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings.

Figure 2:
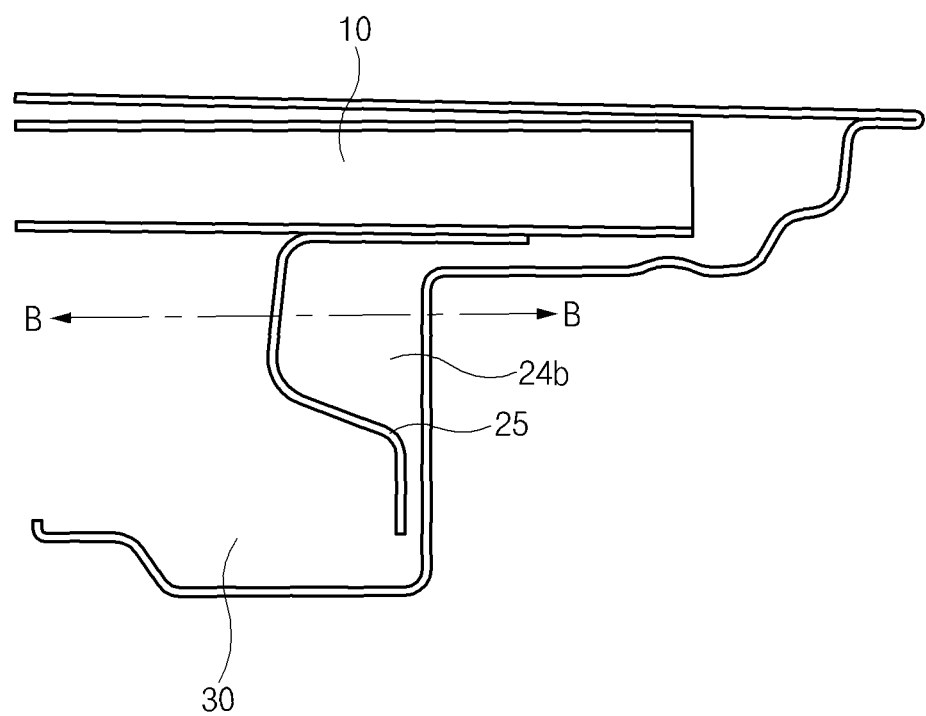
FIG. 2 is a cross-sectional view taken along the line A-A of FIG. 1.

FIG. 1 is a perspective view of a supporting structure of a door impact beam for a vehicle according to an exemplary embodiment of the present invention. FIG. 2 is a cross-sectional view taken along the line A-A of FIG. 1 and FIG. 3 is a cross-sectional view taken along the line B-B of FIG. 2.

Figure 3:
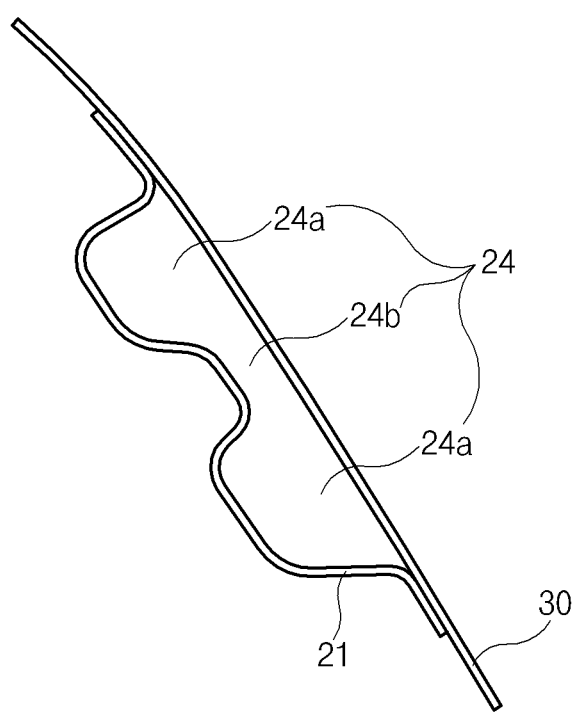
FIG. 3 is a cross-sectional view taken along the line B-B of FIG. 2.
Figure 4:
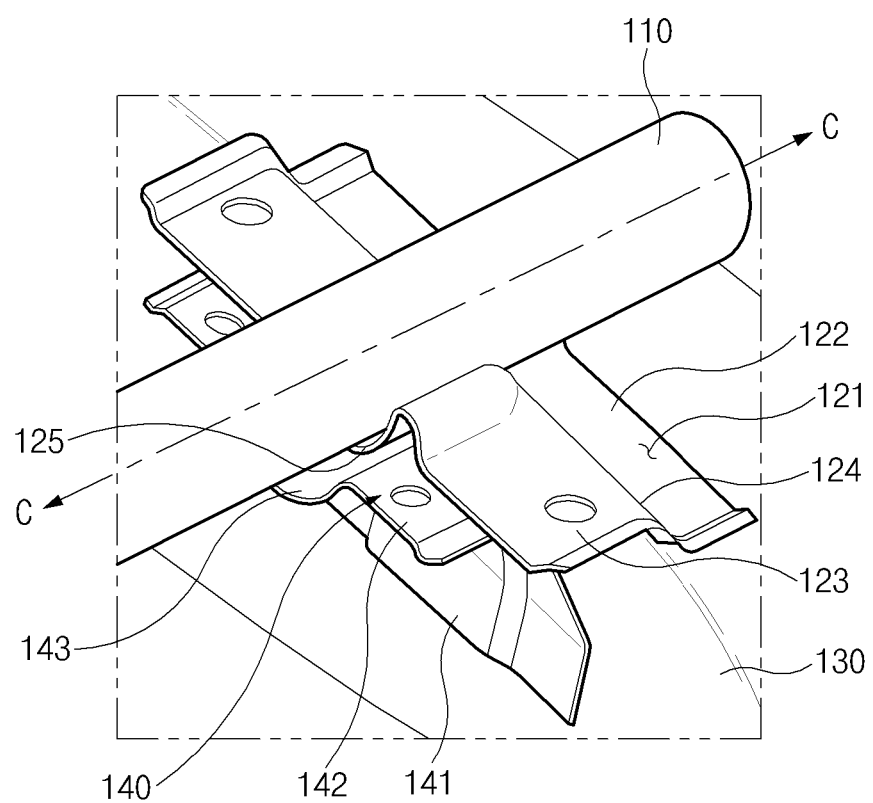
FIG. 4 is a perspective view of a supporting structure of a door impact beam for a vehicle according to the related art.
Figure 5:
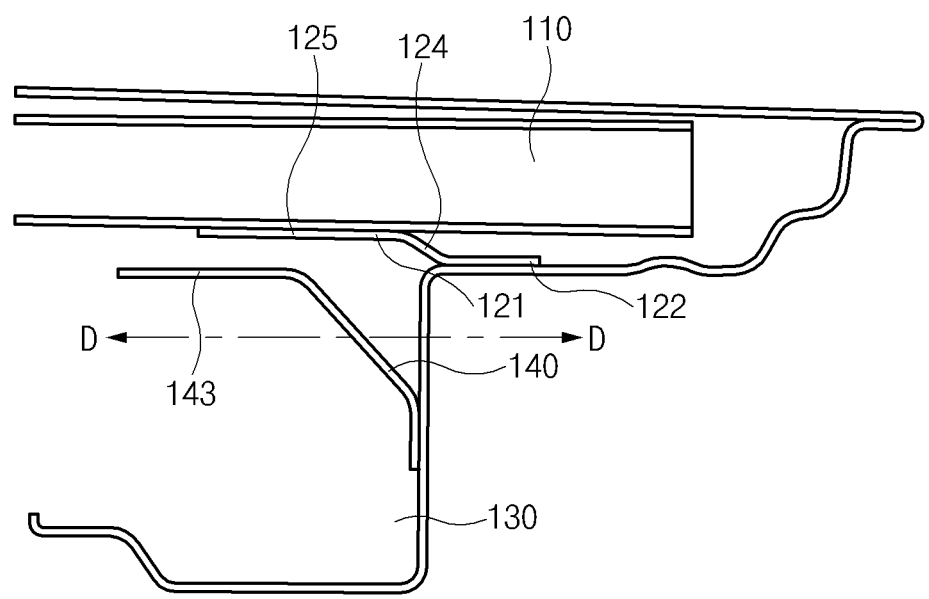
FIG. 5 is a cross-sectional view taken along the line C-C of FIG. 4.
Figure 6:
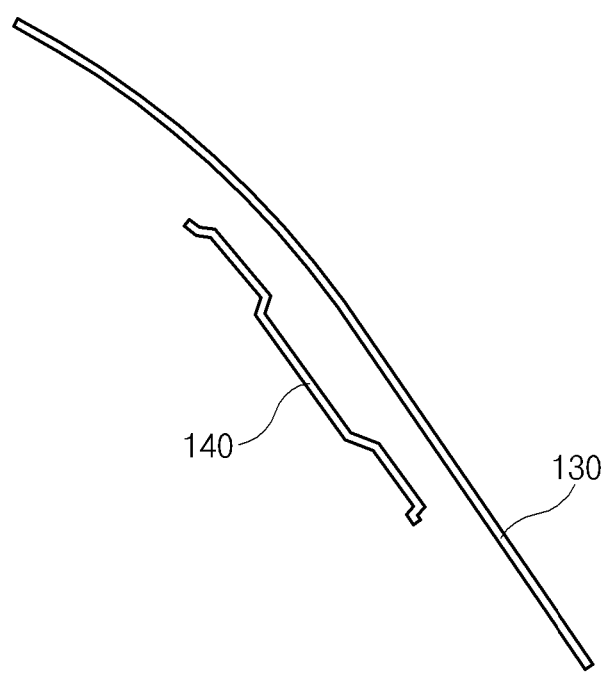
FIG. 6 is a cross-sectional view taken along the line D-D of FIG. 5.

As illustrated in FIGS. 1 to 3, the supporting structure of the door impact beam for a vehicle according to an exemplary embodiment of the present invention includes a coupling part 21 provided with a coupling groove 25 for coupling an impact beam 10, a supporting part 22 bent downwardly from the coupling part 21 to support a supporting structure 20, mounting parts 23 provided along the coupling part 21 and the supporting part 22 and mounted on an inner panel 30 of a door. The coupling part 21, the supporting part 22, and the mounting parts 23 are integrally formed.

The coupling part 21 is disposed at a horizontal part 31 of the inner panel 30 of the door. The coupling part 21 is mounted on the horizontal part 31 of the inner panel 30 by the mounting parts 23 that are integrally formed along both sides thereof. In this case, the coupling part 21 is mounted by a spot welding.

The coupling part 21 forms a convex part 24a of a reinforcing part 24 to be described below by being protruded and bent from the mounting parts 23 formed along both sides thereof. In this case, the formed reinforcing part 24 has a rectangular cross section or may have a cross section of other shapes.

The coupling part 21 is provided with the coupling groove 25 for mounting the impact beam 10. The coupling part 21 forming the reinforcing part 24 by being protruded and bent from the horizontal part 31 of the inner panel 30 is again bent toward the surface of the inner panel 30 to form the coupling groove 25. In this case, the coupling groove 25 may be spaced apart from the inner panel 30 by a predetermined interval while maintaining the protruded state without completely contacting the inner panel 30. This is to further increase rigidity. The coupling groove 25 may have a semi-circular shape according to the cross section of the impact beam 10. This is to expand a contact area between the impact beam 10 and the coupling groove 25. The impact beam 10 is mounted on the impact beam supporting structure 20 by being fitted in the coupling groove 25.

The coupling groove 25 may extend to the supporting part 22 that extends from the coupling part 21. As a result, the coupling part 21 is provided with a concave part 24b of the reinforcing part 24.

The coupling part 21 may again be protruded and bent from the inner panel 30, extending from the coupling groove 25 formed by being bent to a side of the inner panel 30. As a result, the coupling part 21 is provided with the convex parts 24a of the reinforcing part 24.

When the impact beam 10 is mounted in the coupling groove 25, the reinforcing parts have a symmetrical shape based on a longitudinal direction of the impact beam 10 (see FIG. 3). That is, two reinforcing parts 24 are protruded at the upper and lower portions based on the longitudinal direction of the impact beam 10. However, the two reinforcing parts 24 are not necessarily symmetrical based on the longitudinal direction of the impact beam 10, but the reinforcing parts 24 capable of supporting the impact beam 10 at both sides thereof are provided at the upper and lower portions based on the longitudinal direction of the impact beam 10.

The supporting part 22 is provided along the vertical part 32 of the inner panel 30 of the door by extending from the coupling part 21. The supporting part 22 is mounted on the vertical part 32 of the inner panel 30 by the mounting parts 23 integrally formed along both sides of the supporting part 22. In this case, the supporting part 22 is mounted by a spot welding.

The supporting part 22 extends to the coupling groove 25 that is formed on the coupling part 21 to form the concave part 24b of the reinforcing part 24 to be described below. The reason is that the impact beam 10 can be further firmly mounted and the impact energy transferred at the time of the impact may be dispersed based on the coupling groove 25 by the reinforcing part 24. As a result, it is possible to further reduce the impact energy applied to the interior.

Describing in more the shape of the supporting part 22, the supporting part 22 protrudedly extends gradually from the inner panel 30 along the vertical part 32 of the inner panel 30 from the coupling part 21. The supporting part 22 gradually protruded to a predetermined length may again be bent so as to be adjacent to the inner panel 30 side.

The reinforcing part 24 means a space in which the coupling part 21 and the supporting part 22 are protruded from the inner panel 30. The reinforcing part 24 is enclosed by the coupling part 21 protruded from the horizontal part 31 of the inner panel 30 and the supporting part 22 integrally formed with the coupling part 21 and protruded from the vertical part 32 of the inner panel 30. The reinforcing part 24 forms the convex part 24a and the concave part 24b. The shape of the reinforcing part 24 improves the supporting performance of the impact beam 100 since the portion at which the supporting structure 20 is connected with the door is further increased as compared with the related art.

As illustrated in FIG. 2, the concave part 24b is formed by extending the coupling groove 25 to the supporting part 22. The coupling groove 25 mounted on the coupling part 21 contacts the impact beam 10 and is spaced apart from the inner panel 30 of the door by a predetermined interval. The coupling groove 25 extends along the horizontal part 31 of the inner panel 30 and is then bent, such that the coupling groove extends to the supporting part 22.

The convex part 24a is protruded from the inner panel 30 (see FIG. 3). The convex part 24a is formed to gradually expand the reinforcing part 24 along the vertical part 32 of the inner panel 30. Then, the convex part 24a may be provided to have a box-shaped cross section by being again bent toward the vertical part 32 of the inner panel 30. As a result, the impact energy transferred at the time of the impacting may be better transferred to the side of the door and the impact beam 10 may be further firmly supported as compared with the related art. However, the convex part 24a is not necessarily limited to the foregoing shape, but if the convex part 24a is formed by protruding the coupling part 21 and the supporting part 22 from the inner panel 30, the convex part 24a may have other shapes.

The concave part 24b is bent to a side of the inner panel 30 from the convex part 24a (see FIG. 3). The concave part 24b is formed to gradually expand the reinforcing part 24 along the vertical part 32 of the inner panel 30. Then, the concave part 24b may be provided to have a box-shaped cross section by being again bent toward the vertical part 32 of the inner panel 30. As a result, the impact energy transferred at the time of the impacting may be better transferred to the side of the door and the impact beam 10 may be further firmly supported as compared with the related art. However, the concave part 24b is not necessarily limited to the foregoing shape, but if the concave part 24b is formed by protruding the coupling part 21 and the supporting part 22 from the inner panel 30, the concave part 24b may have other shapes.

Two convex parts 24a are provided at the upper and lower portions based on the concave part 24b. As a result, it is possible to improve the supporting performance of the impact beam 10 as compared with the related art.

The ends of the coupling part 21 and the supporting part 22 that are bent to form the reinforcing part 24 may be opened. As a result, it is possible to better disperse the impact energy.

The mounting parts 23 are formed along both sides of the coupling part 21 and the supporting part 22. The mounting parts 23 extend from the horizontal part 31 of the inner panel 30 to the vertical part 32 and are provided along the bent shape of the inner panel 30. The mounting part 23 contacts the surface of the inner panel 30 to mount the overall supporting structure 20 on the door of the vehicle. The mounting parts 23 may be mounted on the door of the vehicle by the spot welding but may be mounted using a coupling member such as a screw.

In an exemplary embodiment of the present invention, the coupling groove 25 may be spaced from the horizontal part 31 with a predetermined interval as shown in FIG. 2.

According to the supporting structure 20 of the impact beam 10 as described above, the impact beam 10 receives the impact energy from the outside and transfers force by rotating the impact energy in a direction formed by bending the reinforcing part 24. As a result, it is possible to transfer most impact energy to the side of the door and further reduce the impact energy transferred to the interior as compared with the related art.

According to the exemplary embodiments of the present invention, it is possible to provide the supporting structure of the door impact beam for a vehicle with the improved supporting performance and impact performance of the impact beam.

Although preferred embodiments of the present invention have been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A supporting structure of a door impact beam for a vehicle mounted on an inner panel of a door for the vehicle, comprising:
   a pair of coupling parts wherein a coupling groove is formed between the coupling parts and wherein the impact beam is coupled to the coupling groove;
   a pair of supporting parts bent downwardly from the coupling parts and supporting the coupling parts, wherein the coupling groove extends between the supporting parts; and
   mounting parts provided along side portions of the coupling parts and the supporting parts and mounted on the inner panel of the door,
   wherein the coupling parts, the supporting parts, and the mounting parts are integrally formed, and
   the coupling parts and the supporting parts are protruded from the inner panel of the door to form a reinforcing part;
   wherein an end of the coupling parts and an end of the supporting parts are open, and
   wherein each of the supporting parts is outwardly convex.

2. The supporting structure according to claim 1, wherein the coupling groove is spaced from the inner panel with a predetermined interval.

3. The supporting structure according to claim 1, wherein a portion of the supporting parts is spaced from the inner panel with a predetermined interval.

4. The supporting structure according to claim 1, wherein a portion of the coupling parts is spaced from the inner panel with a predetermined interval.

5. The supporting structure according to claim 1, wherein the coupling groove is outwardly concave between the coupling parts and the supporting parts.

6. The supporting structure according to claim 1, wherein the coupling parts are outwardly convex.

7. The supporting structure according to claim 6, wherein the supporting parts and the coupling parts are symmetrical to each other about the coupling groove.

8. The supporting structure according to claim 1, wherein the mounting parts are coupled with the inner panel of the door by a welding.

* * * * *